US007023703B2

(12) United States Patent
Peloza

(10) Patent No.: US 7,023,703 B2
(45) Date of Patent: Apr. 4, 2006

(54) MODULE RETENTION LATCH ASSEMBLY

(75) Inventor: Kirk B. Peloza, Naperville, IL (US)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 10/969,553

(22) Filed: Oct. 20, 2004

(65) Prior Publication Data
US 2005/0083670 A1    Apr. 21, 2005

Related U.S. Application Data

(60) Provisional application No. 60/512,630, filed on Oct. 20, 2003.

(51) Int. Cl.
H05K 7/16    (2006.01)
H05K 5/06    (2006.01)
H05K 7/18    (2006.01)
H05R 12/16   (2006.01)
H01R 13/62   (2006.01)

(52) U.S. Cl. .............. 361/727; 361/756; 361/728; 361/731; 361/736; 361/788; 361/801; 361/802; 439/372; 439/312; 439/332.1

(58) Field of Classification Search .......... 361/727, 361/728, 731, 735, 736, 748, 752, 754, 756, 361/788, 801; 439/372, 312, 332.1
See application file for complete search history.

(56) References Cited

U.S. PATENT DOCUMENTS

| 4,154,495 A | 5/1979 | Crewse |
| 4,204,738 A | 5/1980 | Tillotson |
| 4,376,563 A | 3/1983 | Margrave et al. |
| 4,671,594 A | 6/1987 | Ohtsuki et al. |
| 4,787,858 A | 11/1988 | Killian, Jr. |
| 4,897,039 A | 1/1990 | Uchida et al. |
| 4,969,838 A | 11/1990 | Himes et al. |
| 5,076,803 A | 12/1991 | Mutarelli et al. |
| 5,666,266 A | 9/1997 | Katoh et al. |
| 5,879,173 A | 3/1999 | Poplawski et al. |
| 5,901,263 A | 5/1999 | Gaio et al. |
| 5,924,886 A | 7/1999 | Achammer et al. |
| 6,000,957 A | 12/1999 | Betker et al. |
| 6,062,893 A | 5/2000 | Miskin et al. |
| 6,135,793 A | 10/2000 | Babineau |
| 6,142,802 A | 11/2000 | Berg et al. |
| 6,149,465 A * | 11/2000 | Berg et al. ............... 439/630 |
| 6,351,394 B1 | 2/2002 | Cunningham |

(Continued)

OTHER PUBLICATIONS

International Search Report for International Application No. PCT/US03/10743.

Primary Examiner—Kamand Cuneo
Assistant Examiner—Hung Nguyen
(74) Attorney, Agent, or Firm—Thomas D. Paulius

(57) ABSTRACT

A housing for an adapter module is provided with a bail latch mechanism that serves to engage and disengage the frame into which the adapter module housing fits. The housing is stamped and formed from a piece of sheet metal and the bail latch is rotatably mounted in the housing. The bail latch is movable between two positions and the bail latch engages a cam member that is stamped and formed in one side of the housing so that movement of one end of the bail latch over the cam member cams one of the two free ends of the bail latch inwardly into the housing to thereby release the housing from the adapter frame.

14 Claims, 18 Drawing Sheets

U.S. PATENT DOCUMENTS

| | | |
|---|---|---|
| 6,419,568 B1 * | 7/2002 | Walker et al. ............... 451/285 |
| 6,430,053 B1 * | 8/2002 | Peterson et al. ............ 361/728 |
| 6,439,918 B1 | 8/2002 | Togami et al. |
| 6,533,603 B1 | 3/2003 | Togami |
| 6,538,882 B1 * | 3/2003 | Branch et al. ............... 361/687 |
| 6,652,298 B1 | 11/2003 | Ohnuki |
| 6,731,510 B1 * | 5/2004 | Hwang et al. ............... 361/754 |
| 6,884,097 B1 * | 4/2005 | Ice ............... 439/160 |
| 6,890,206 B1 * | 5/2005 | Distad et al. ............... 439/372 |
| 6,893,168 B1 * | 5/2005 | Huang et al. ............... 385/92 |
| 6,908,323 B1 * | 6/2005 | Ice ............... 439/160 |
| 2005/0208822 A1 * | 9/2005 | Ishigami et al. ............ 439/372 |

* cited by examiner

MODULE RETENTION LATCH ASSEMBLY

REFERENCE TO RELATED APPLICATIONS

This application claims priority from U.S. Provisional Patent Application No. 60/512,630, filed Oct. 20, 2003.

BACKGROUND OF THE INVENTION

The present invention relates generally to adapter modules, and more particularly to an adapter module having a retention member that is easily operable to hold the adapter module in place or to release it from within an adapter frame.

Adapter frames or modules are used in many different applications and are usually used to contain an electrical component, such as an optical transceiver or a cable to board connector. Adapter modules are used in a wide variety of applications that range from simple connecting faces between hard (copper) conductor wiring to more sophisticated applications that may involve optical fibers, flexible or printed cables, etc. In many instances, adapter modules house converters that are used to convert optical signals or electrical signals or electrical signals to optical signals. These modules are used to convert high speed signals from either copper to optical or optical to copper, while maintaining the signals at high speeds, such as in the gigabit range. These adapter modules are placed into adapter frames that are usually attached to a circuit board, and the modules are retained in place in the adapter frames by retention means.

One such retention means is the use of thumbscrews. These thumbscrews are difficult to operate in environments with many cables, for the user has to move the cables to the side when installing, removing or reconfiguring the cables. Thus, these adapter modules are not easily pluggable.

Another retention device, such as that described in U.S. Pat. No. 6,439,918, issued Aug. 27, 2002, uses a multi-part retention mechanism that includes a bail latch formed as a closed loop, a pivot block ands an external housing that fits over the module body. This structure is complex and uses many parts, so that alignment is a concern when assembling the mechanism.

Other retention devices require portions of the mechanism, such as the cams, to be formed as part of the module housing and thus increase the cost of manufacture of the module housing. These die cast housings may not be utilized in certain module applications.

Additionally, many module retention systems have no means integrated with them that indicate the status of the module in either a latched or unlatched condition upon actuation of the retention mechanism.

Accordingly, the present invention is directed to an improved adapter frame, or module housing having a simple to use retention means that holds the adapter frame or module in place between two circuit boards, and which may have an indicator assembly integrated therewith.

SUMMARY OF THE INVENTION

It is therefore a general object of the present invention to provide an adapter module that easily slides into a an adapter frame and which uses a moveable latch to retain it in place within the frame.

Another object of the present invention is to provide an adapter module that utilizes a simple wire bail latch having two free ends that engage openings in the frame, and the bail latch is moveable about its free ends between two positions, wherein in one of the two positions, the free ends of the bail latch extend outwardly from the adapter module to provide interfering posts that serve to retain the adapter module in place within the adapter/frame and in the other of the two positions, the free ends of the bail latch are withdrawn inwardly into the adapter module so that they do not interferingly engage the adapter frame to thereby permit the adapter module to be easily removed from the bezel.

A further object of the present invention is to provide an adapter module with a retention bail latch that is moveable between two positions wherein the adapter module is either retained within a guiderail or removable therefrom, the bail latch preventing the cable assembly from being attached to the transceiver within the adapter module prior to installation of the adapter module into its host unit.

Yet another object of the present invention is to provide an adapter module with a moveable bail latch as described above, the module having a housing with a cam member formed therein proximate to the free ends of the bail latch, the bail latch engaging the cam members in its movement to thereby draw one or more of the bail latch free ends inwardly into the adapter module during movement of the bail latch to an open position.

Still a further object of the present invention is to provide an electronic module assembly that has a module retention aspect and an indicator switch assembly integrated therewith.

Yet another object of the present invention, as exemplified by another embodiment thereof, is to provide a module retention assembly that is adapted for mounting to a circuit board, the retention assembly including a housing for mating to the circuit board, and a bail latch that is rotatably held by the housing, the bail latch being movable between first and second positions, wherein the first position, the bail latch is moved away from the entrance of the housing and permits a module to be inserted into the housing and further engages the housing and module in place within another assembly, and wherein in the second position, the bail latch extends across the entrance of the housing and prevents the entrance of a module into the housing, while disengaging the housing from the other assembly, the housing having a cam or interference surface formed therein that moves the bail latch legs to cause at least one of the free ends of the bail latch to move inwardly of the housing.

Still another object of the present invention is to provide a module retention assembly for retaining modules in place in which the assembly includes a housing that is stamped and formed from a piece of sheet metal and which rotatably holds an open-ended bail latch in place, the sheet metal being formed to provide a hollow enclosure with means for engaging a circuit board in a mounting manner, the hollow enclosure including a central opening for receiving the passage therethrough of an electronic module, the housing further including a pair of slots disposed on opposite sides of the opening, and at least one cam surface member being formed from the housing and projecting into the slot into the path of the bail latch in its movement between two operative positions, such that movement of the bail latch from one to the other of the two operative positions causes a portion of the bail latch to ride along the cam surface and displace a free end of the bail latch, thereby disengaging the module housing from another outer assembly.

Yet a further object of the present invention is to provide a indicating switch as part of the aforementioned housing, the switch having a contact head that extends into the housing into contact with the bail latch so that movement of the bail latch between its two operative positions is sensed by the switch and indicated to a user of the module accordingly.

The present invention accomplishes these and other objects and aspects by virtue of its structure. In one principal aspect of the present invention, and as exemplified by a first embodiment of the invention, an adapter module is provided with a means for securing it in place within an adapter frame that is mounted to a circuit board. The module has a hollow body that is sized to receive therein an electronic device such as a connector, transceiver, optical to electrical connector or the like and the device may have a circuit board that extends outwardly therefrom for mating with an opposing connector mounted to the circuit board. The module body further may include an exterior flange that extends around it for flush engagement with either a faceplate or the front edge of an adapter frame mounted to the circuit board.

The securing means preferably takes the form of a bail latch that has a general U-shape with two free ends. The free ends are received within openings formed in the module sidewalls and the free ends are interconnected by a horizontal bar that extends across the front of the module.

The bail latch is moveable between two operative positions. In the first operative position, the bail latch bar lies across the front of the module and prevents connection therewith of any cable assemblies. In the second operative position, the bail latch is raised permitting insertion of cable assemblies into the module. The module may include a pair of cam members having cam surfaces that the bail latch rides upon in its movement between two operative positions. These cam members serve to draw the free ends of the bail latch inwardly so that the module may be inserted into, or removed from, the adapter frame. When the free ends of the bail latch are not cammed inwardly, they extend through an exterior of the module sidewalls and into an interference engagement with the adapter frame that prevents the module from being removed from the adapter frame.

In another principal aspect of the present invention and as exemplified by another embodiment of the present invention, the housing for the module includes a circuit board, an internal connector and a housing mounted to an edge of the circuit board. A bail latch is rotatably supported within the housing and has a general U-shape, that is similar to, but which is specifically different than the embodiment described above. In this bail latch, one of the latch's free ends is kept in place within one part of the housing so that it may rotate as the bail latch is moved between its first and second operative positions. The other free end is free to rotate and translate and encounters a cam surface formed in another part of the housing. The cam surface cams the free end inwardly with respect to the housing so that it will disengage from an exterior assembly in which the module is housed.

The housing may be formed from a single piece of sheet metal, thereby reducing the cost involved with the structure as compared to a conventional die-cast module housing. In the forming process, a blank is stamped and formed to define an end wall of the module housing with a module entrance that is flanked by two slots. The bail latch has a central bail portion that is manipulated by the user and which serves as a blocking element that crosses the entrance of the housing in the second position. It preferably has two legs that extend from the central portion at angles thereto to define a general U-shape and each leg diverges at an angle to terminate in a free end that is spaced apart from the central portion in two different planes. A cam member is formed in the housing that projects into one of the two slots. This cam member presents a surface that the bail latch leg encounters in its movement between the first and second operative positions. In one of the two positions, the bail latch leg contacts the cam member and only the free end of the bail latch that extends from that particular leg is moved inwardly of the housing and out of engagement with an exterior assembly or housing so that the module assembly may be removed therefrom.

The bail latch legs extend in two different planes and follow an angled path as they diverge from the central portion of the bail. In this manner, a reaction or cam surface is defined on the legs and this surface rides along and over the cam surface formed as part of the module housing. The reaction surface is disposed in a vertical plane so that it may ride along the rear of the cam surface and such riding movement draws the free end of the bail inwardly within the housing, thereby disengaging it from any exterior housing or assembly.

In another aspect of the invention, one of the bail latch legs preferably includes an angled section located proximate to the cam surface. This angled section contacts, during operational movement of the bail, an actuator that is mounted on the housing proximate thereto. This contacts moves the actuator into contact with an indicator, or switch, that may be mounted to the circuit board and the switch may then indicate the removal status of the module.

Other objects, features and advantages of the invention will be apparent from the following detailed description taken in connection with the accompanying drawings.

BRIEF DESCRIPTION OF THE DRAWINGS

The invention, together with its objects and the advantages thereof, may be best understood by reference to the following description taken in conjunction with the accompanying drawings, in which like reference numerals identify like elements in the figures and in which.

DETAILED DESCRIPTION OF THE PREFERRED EMBODIMENTS

Figure 1:
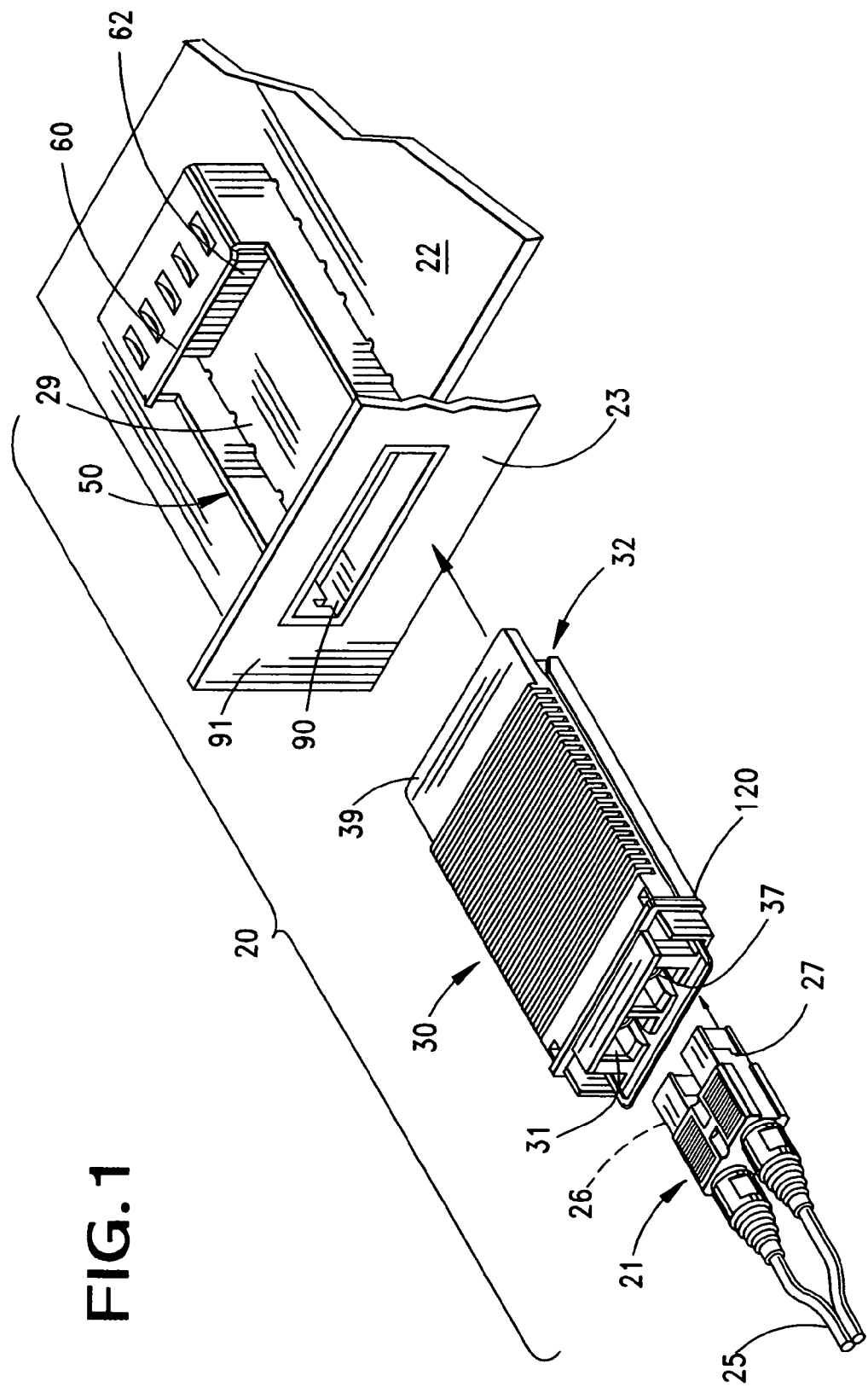
FIG. 1 is an exploded perspective view of an adapter frame/module assembly that utilizes an adapter module constructed in accordance with the principles of the present invention in its operational environment with a cable assembly.

FIG. 1 illustrates an electrical assembly 20 that is used to provide an interface between one device (not shown) that has a cable assembly 21 leading from it to another electronic device (also not shown) that has a circuit board 22 associated therewith and which is enclosed in a housing 23. Such assemblies are commonly used in the telecommunication industry and may include a fiber or other type of optical deice that transmits signals through a fiber optic cable 25 which are terminated to one or more transmitters 26, that are housed within connector housing 27 that are illustrated as plug connectors in the drawings.

These cable assemblies 21 plug into what is known in the art as an adapter module 30 that in turn is received within an adapter frame 50 that is mounted to the circuit board 22 and that partially surrounds, or encloses, a connector 60 mounted on the circuit board 22 and having a plurality of conductive terminals 62 that are terminated to circuits on the circuit board 22.

Figure 4:
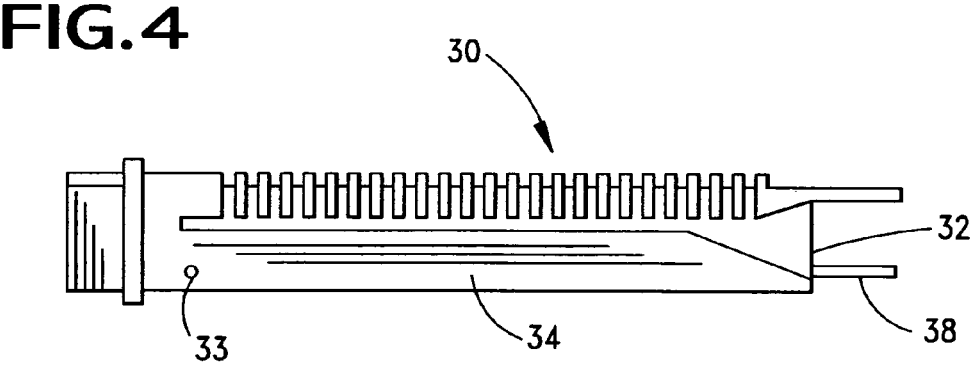
FIG. 4 is a side elevational view of the adapter module of FIG. 3, with the bail latch removed for clarity.

The module 30 houses one or more electronic devices, typically converters that connect high speed signals from copper cables or fiber optic cables to electrical signals that can be transmitted through the connector terminals 62 and onto the selected circuits on the circuit board 22. The electronic devices may typically include a pair of optical converter heads 37 that are contained in nests, or openings 31, of the module 30 and these conversion heads may include additional electronic structure that ends in a circuit board 38 (FIG. 4) that extends out from the rear face 32 of the module 30. One type of module and its internal components are illustrated and described in U.S. Pat. No. 6,062,893, issued May 16, 2000.

Figure 2:
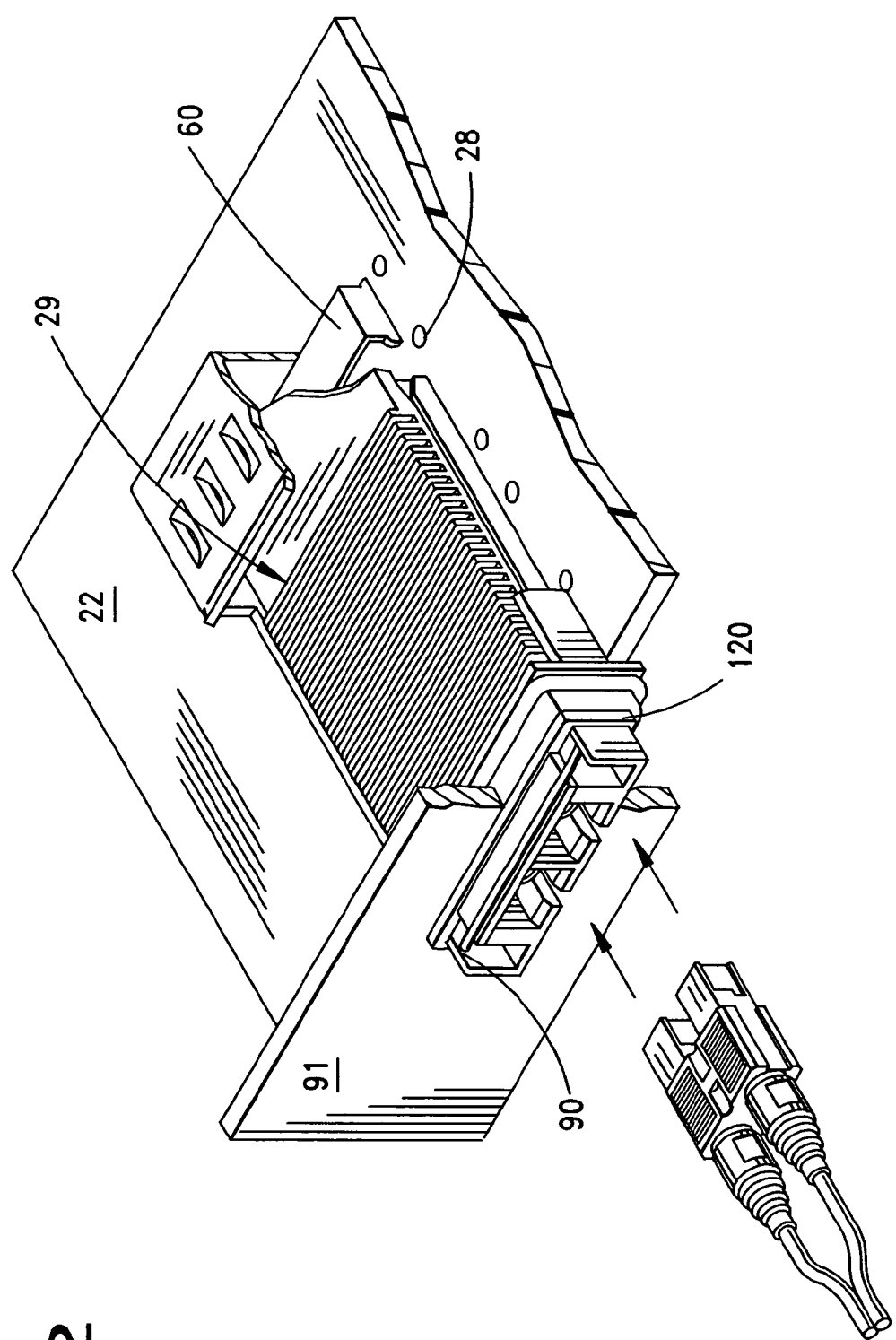
FIG. 2 is the same view as FIG. 1, but partially cutaway and illustrating the adapter module in place within its adapter frame and ready to receive the cable assembly therein.

The module 30 is received within an adapter frame 50 that is mounted to a circuit board 22. The adapter frame, as illustrated best in FIG. 3, has a rectangular shape with a pair of side walls 52 interconnected by opposing front and rear faces 53, 54. The rear face 54 of the adapter frame 50 includes a rear wall 55 that closes off the rear of the frame 50 and further includes a transverse rear member 56 with spring arms 57 formed therein that depend downwardly into the cavity 29 defined within the adapter frame 50. These spring arms 57 engage a rear ledge 39 (FIG. 1) formed in the module 30 in order to provide effective grounding of the module 30. This grounding into grounding circuits on the circuit board 22 and occurs primarily by way of a series of engagement pins 58 that are preferably formed as part of the adapter frame 50 and which may be received within plated holes, or vias 28 (FIG. 2) formed in the circuit board 22.

Returning to FIGS. 3 and 3A, the module 30 is preferably die cast from a conductive material and may be formed of one or more parts with a hollow internal cavity (not shown) that receives and houses converters, of which only the connector heads 37 and the rear circuit board 38 are shown.

Figure 3:
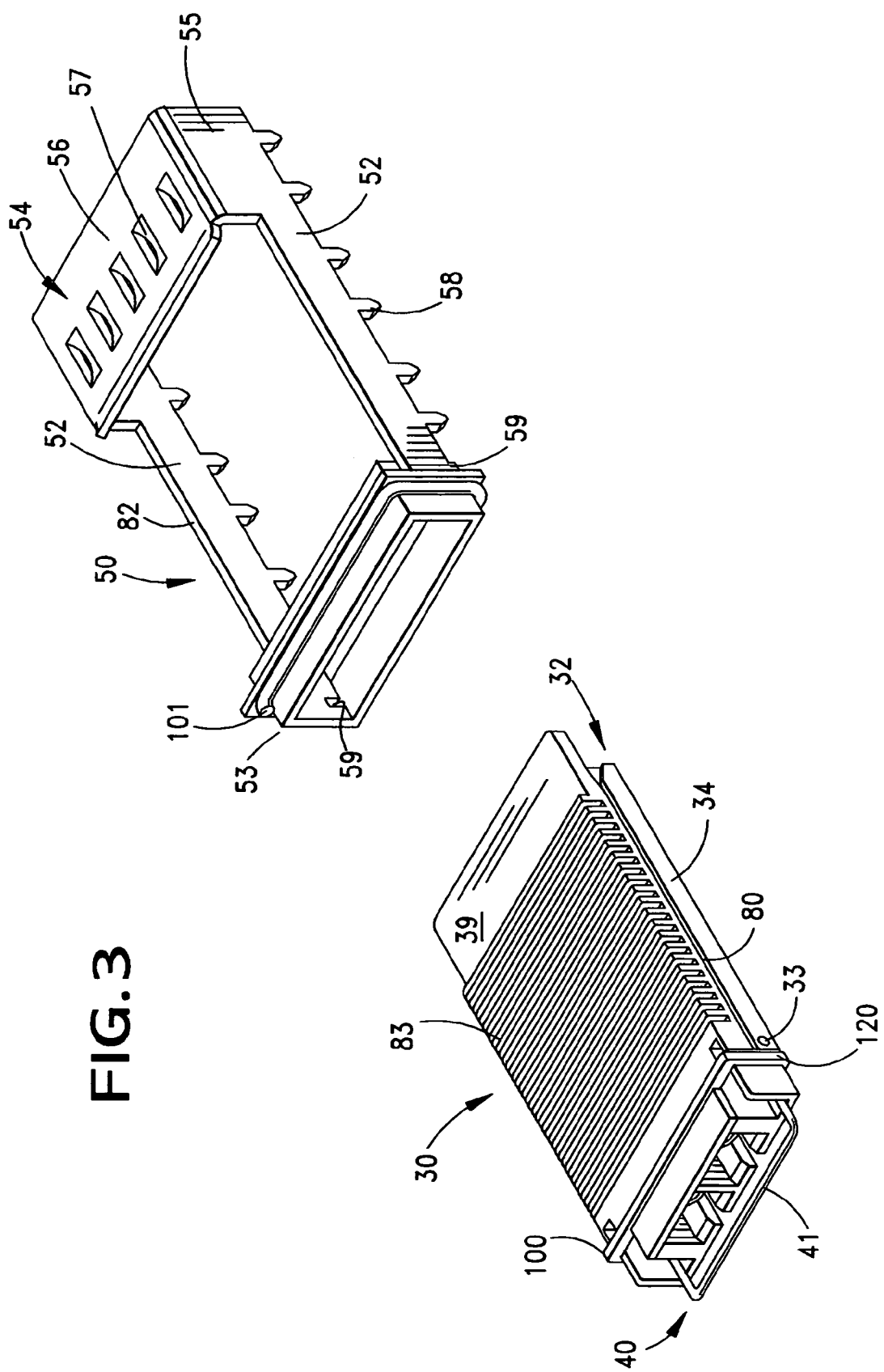
FIG. 3 is a perspective view of the adapter module and adapter frame of FIG. 1 in alignment with each other prior to insertion of the frame/module into the frame and illustrating the module in a position ready for insertion/removal from the frame.
Figure 8:
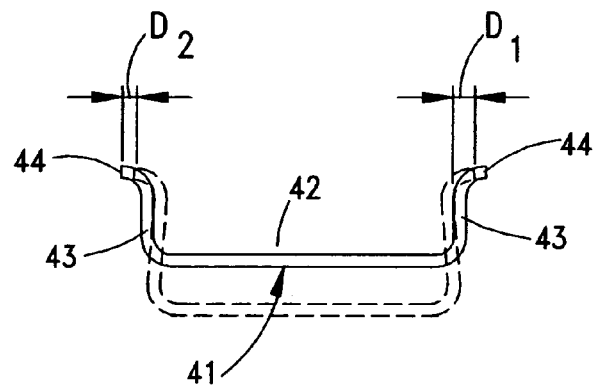
FIG. 8 is a diagrammatic view of the bail latch of the adapter module of the present invention illustrating the displacement that occurs therein during movement between its two operative positions.

The front face of the module 30 has a pair of openings 31, each communicating with a specific converter head 37. These openings 31 receive the connector housings 27 of the cable assembly plug connectors. In order to retain the module 30, within the adapter frame 50, a retention means 40 is provided in the form of a moveable (or rotatable) bail latch 41. As illustrated in FIG. 8, the bail latch 41 has a general U-shape having a base 42 that extends transverse to two legs 43. The legs 43 terminate in free ends 44 that also extend in the transverse direction of these free ends 44 and are received within a pair of openings 33 (FIGS. 3 and 4) that are formed in the sidewalls 34. The free ends 44 are movable in the openings 33 so that the bail latch 41 may be moved (preferably rotated) between first and second operative positions. In the first operative position, which is illustrated in FIG. 3, the bail latch 41 extends horizontally in front of the movable openings 31 and its base part 42 extends crosswise in front of the module openings 31 in a manner so as to interfere with insertion of the cable connector housing 27 therein. In this same position, the free ends 44 are drawn inwardly of the module sidewalls 34 and adapt the position shown by the dashed lines in FIG. 8 where the free ends 44 are drawn and do not project outside of the module sidewalls 34, as illustrated in FIG. 3.

Figure 3A:
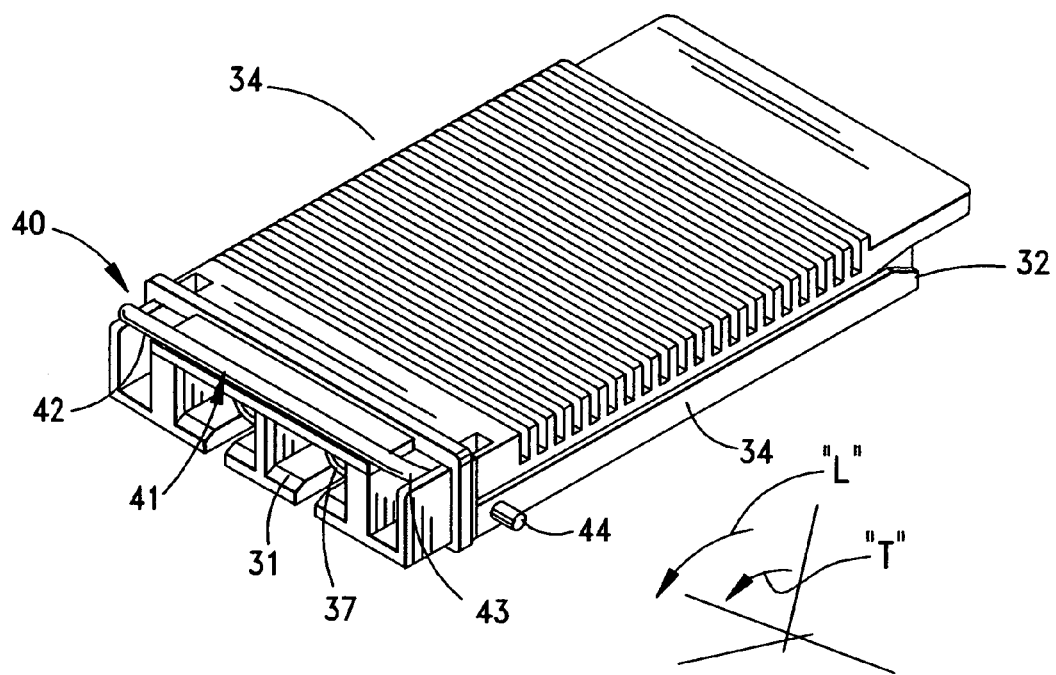
FIG. 3A is a perspective view of the adapter module of FIG. 3 with its bail latch moved to a retention or engagement position.
Figure 5:
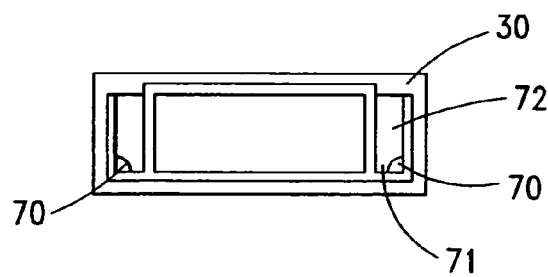
FIG. 5 is a front elevational view of the adapter module of FIG. 4.
Figure 6:
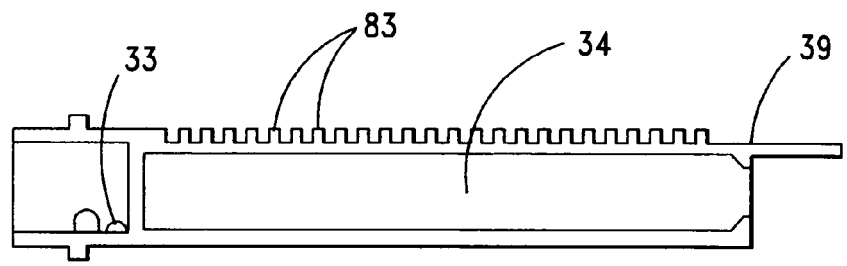
FIG. 6 is a lengthwise sectional view of the adapter module of FIG. 4.
Figure 9:
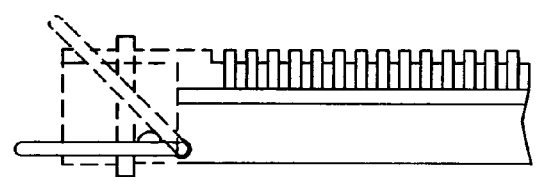
FIG. 9 is a partial side elevational view of the adapter module of the present invention illustrating the range of movement between the two positions of the bail latch.

In the second operative position, as illustrated in FIG. 3A, the bail latch 41 is raised up and over the openings 37 on the front face of the module 30. This position is shown in outline in FIGS. 8 and 9 and no interference is presented with any cable assemblies. In order to provide the inward-outwardly movement of the bail latch free arms 44 in concert with the upward-downward movement of the bail latch, the adapter module 30 includes a pair of cam members 70 that are preferably integrally formed with the module 30. As shown in FIG. 5, these cam members 70 are located along the inner base 71 of the slots 72. The cam member 70 are preferably three-dimensional bumps having covered surfaces that are curved with a radius both in the transverse direction "T" (FIG. 3A) and the longitudinal direction "L" so that the bail latch legs 43 will cam inwardly to pull the free ends 44 of the bail latch inwardly 20 that they do not project from the module sidewalls 34 and into the adapter frame openings 59.

Figure 7:
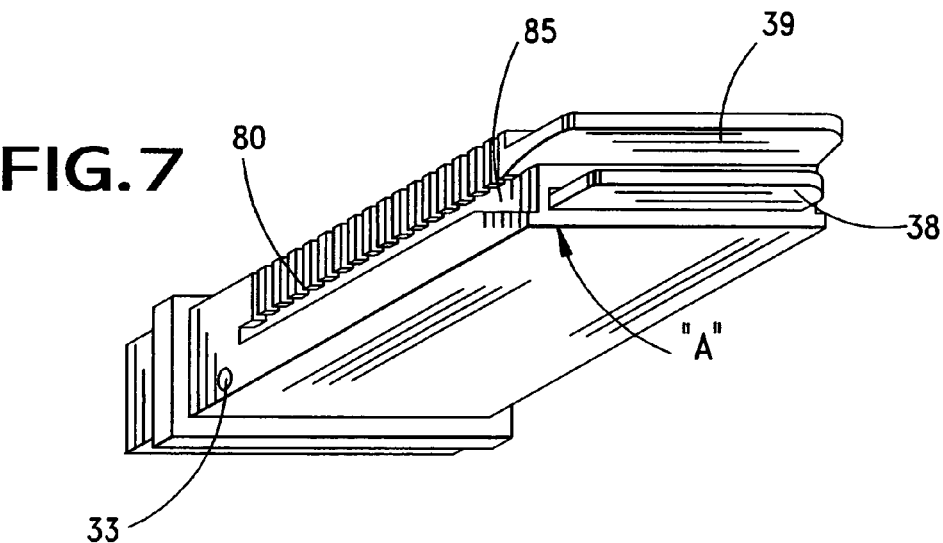
FIG. 7 is a perspective view of the adapter module of FIG. 4 taken from the underside thereof.
Figure 7A:
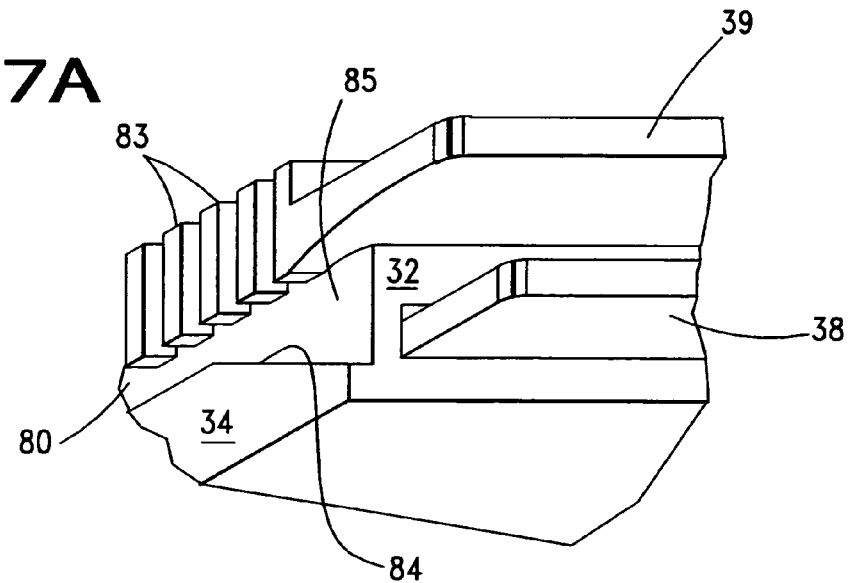
FIG. 7A is an enlarged detail view of the portion designated "A" in FIG. 7.

In another aspect of the present invention, the module 30, may have a pair of slots 80 formed therein that extend lengthwise of the module 30. These slots 80 receive and engage corresponding guiderails 82 that are formed as part of the adapter frame 50 and which bend inwardly into the internal cavity 29 of the frame 50. As seen best in FIGS. 7 and 7A, the slots 80 may be further disposed in the module sidewalls 34 just beneath the heat dissipating fins 83 that are preferably formed as part of the module 30. At the rear face 32 of the module 30, the slots 80 open in a diverging manner by way of an angled wall 84 to create a large opening 85 with an angled lead-in surface 84 that will permit the adapter module 30 to be tilted into place as to engage the adapter frame guiderails 82 or to engage an adapter frame 50 that is itself slightly tilted with respect to an opening 90 in a device foreplate, or bezel 91.

Figure 12A:
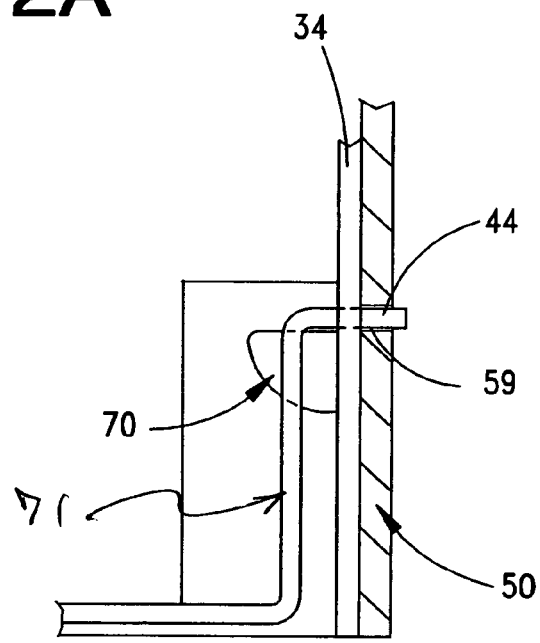
FIG. 12A is an enlarged detail view of the bail latch in a raised position such as is shown in FIG. 3A, with the bail latch positioned above the cam member.
Figure 12B:
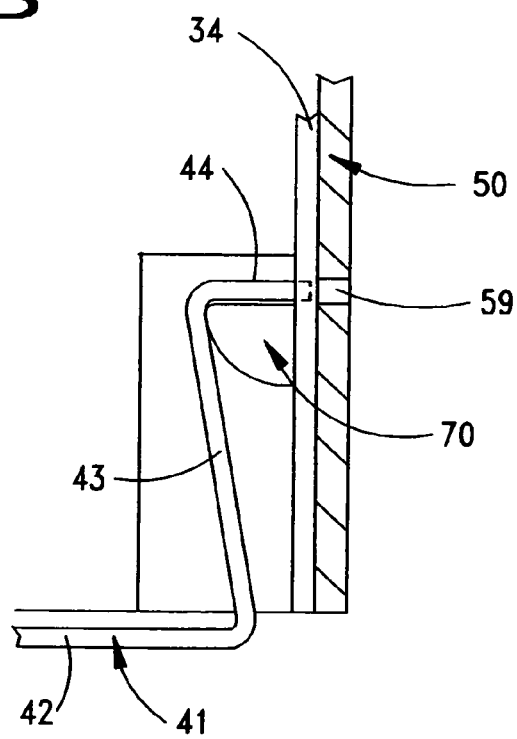
FIG. 12B is the same view as FIG. 12A, but with the bail latch in a depressed position as shown in FIG. 3 where the bail latch legs and free ends have deflected inwardly.

Turning now to FIGS. 12A and 12B, these figures show in detail the relationship between the cam member 70 and the bail latch 41. In FIG. 12A, the bail latch 71 extends up at an angle as in FIG. 3A and the latch legs 43 are positioned above the cam member 70. In FIG. 12B, the bail latch 41 has been moved down to a horizontal position as in FIG. 3 and it can be seen that the latch legs 43 have ridden down on the cam member 70 and so deflected inwardly. This deflection occurs along the latch legs 43 (shown as D1, in FIG. 8) and also along the latch free ends 44 (shown as D2 in FIG. 8). In this deflection, the free ends 44 are withdrawn from their engagement with the frame openings 59, and preferably partially into the module sidewall 34 so that the module 30 may be freely and easily inserted into and removed from the frame 50.

The module flange 120 may have an electromagnetic gasket 100 applied thereto as its rear face 50 so that it mates with a like electromagnetic gasket 101 supported on the adapter frame front face.

Figure 10:
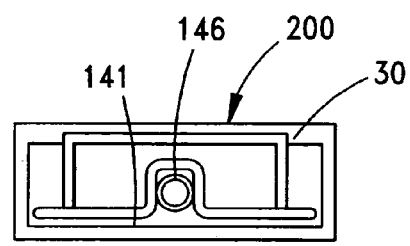
FIG. 10 is a front elevational view of an adapter frame/module having an alternative bail latch.
Figure 11:
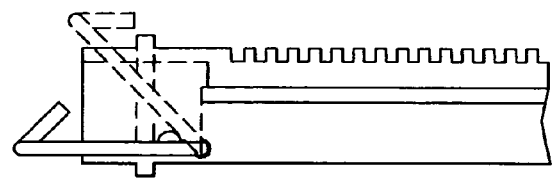
FIG. 11 is a partial side elevational view of the adapter frame/module of FIG. 10.

Another embodiment 200 is illustrated in FIGS. 10–11 where the module 30 includes a bail latch 141 that has a recess or slot 146 formed therein to receive a cable or patch cord.

Figure 13:
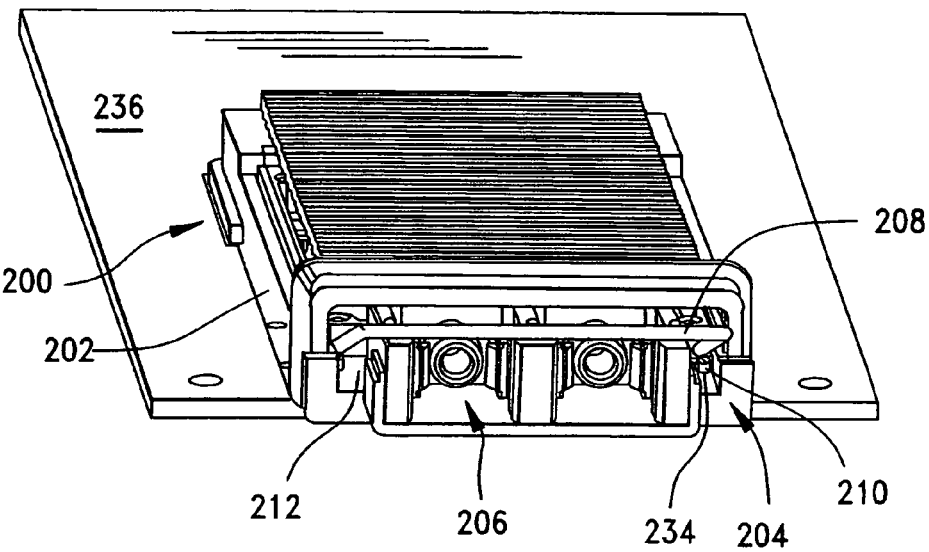
FIG. 13 is an angled perspective view of a module in place within an adapter frame and illustrating the bail latch in a up position, wherein the module is engaged with the adapter frame and which utilizes a cam member that is raised off the floor of the module.
Figure 14:
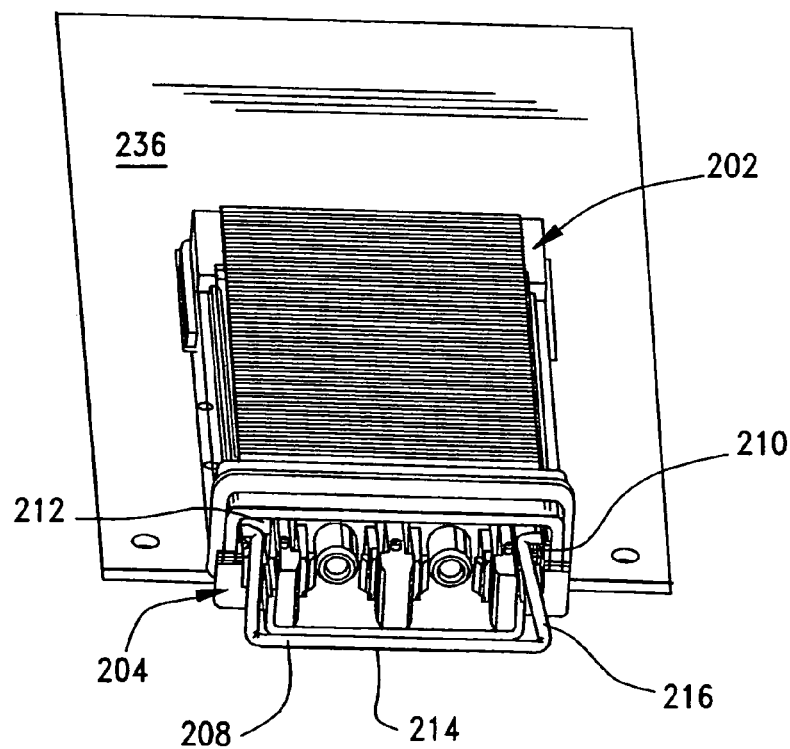
FIG. 14 is a similar view as FIG. 14, taken at a different angle, but illustrating the bail latch in a lowered position, wherein the module is disengaged with the adapter frame and the free ends of the bail latch are cammed out of engagement with the adapter frame.

FIGS. 13–19 illustrate the interaction of the bail latch free ends and the module adapter frame more clearly. In FIG. 13, the assembly 200 is shown as an adapter frame 202 that has a pair of side walls which are interconnected by rear and front members. The adapter frame 202 is shown mounted to a circuit board 236 and the frame holds an electronic module 204 therein. The module shown is an optical transceiver, but it will be understood that other suitable types of components may be used as modules.

The module 204 has a pair of openings 206 that communicate with its front face to permit the coupling thereto of cables and the like. The module 204 is equipped with a moveable bail latch 208 of the type described previously. The bail latch 208 has a U-shape with a base 214 that may by moved up or down into and out of interference with the module openings 206, and a pair of legs 216 that terminate in free ends 218. These legs 216 are moveable, or pivotable, within slots 212 disposed within the module 204 and they move, or pivot around their associated free ends 218. A cam member 210 is shown disposed within the slots 212 in a position to interfere with the movement of the bail latch 208, particularly the legs 216 thereof.

Figure 15:
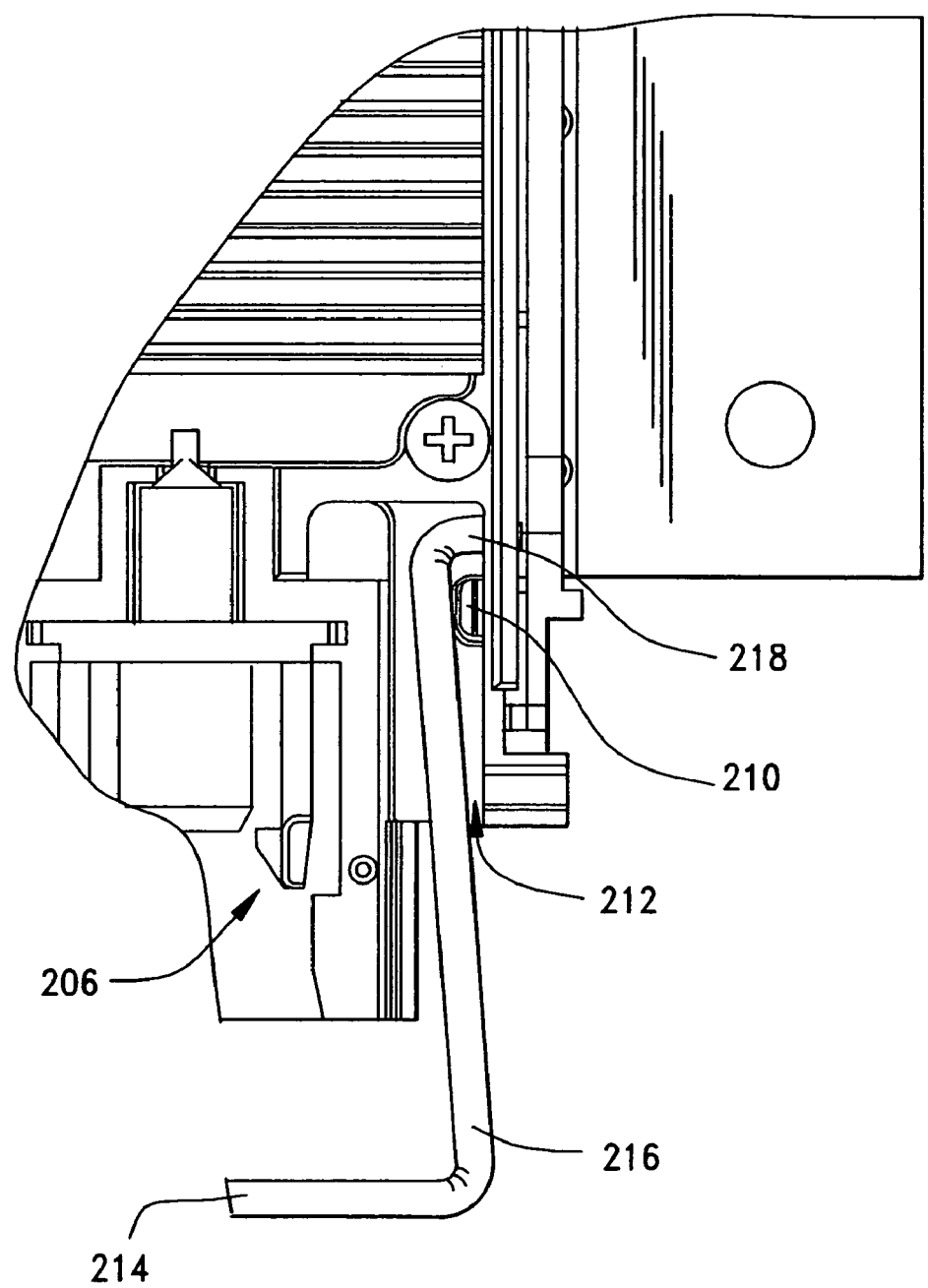
FIG. 15 is an enlarged, partial top plan detail view of the cam member and the bail latch when the module is in the position as illustrated in FIG. 14.
Figure 16:
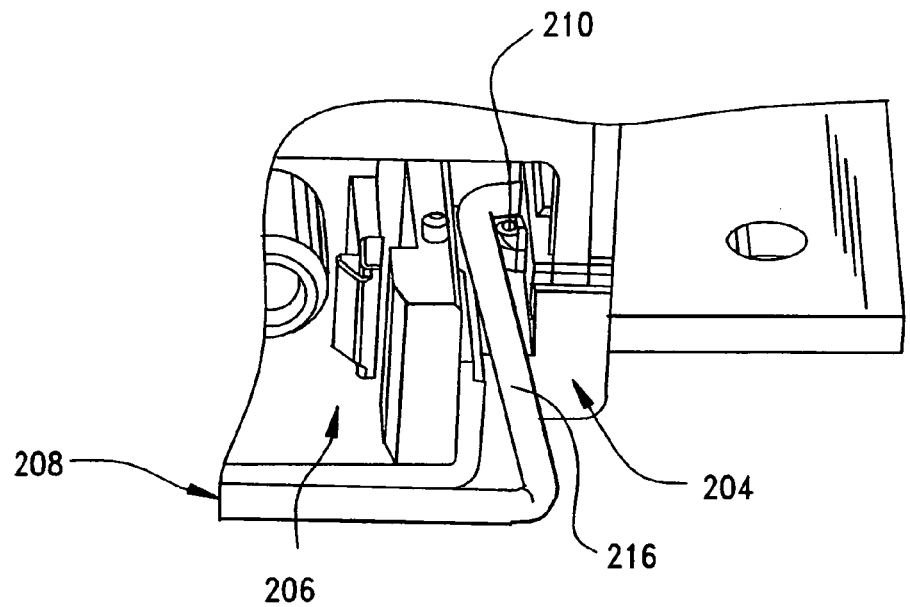
FIG. 16 is an angled enlarged detail view of the bail latch-cam member engagement when the bail latch is in a lowered position as shown in FIG. 14.
Figure 17:
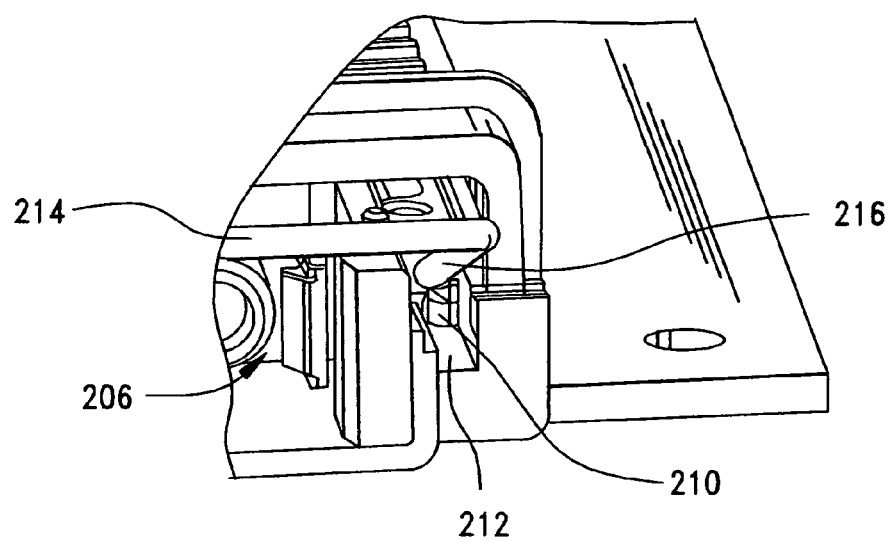
FIG. 17 is a view similar to that of FIG. 16, but of the bail latch-cam member in the position when the module is in the position as illustrated in FIG. 13.
Figure 18:
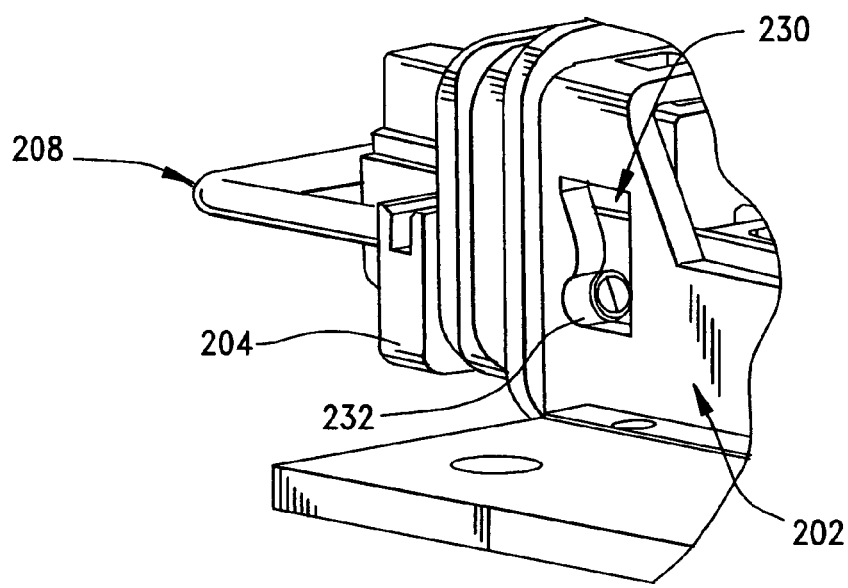
FIG. 18, is an enlarged detail view of the front side of the module as illustrated in FIG. 14, showing one free end of the bail latch disengaged from the adapter frame and the bail latch in front of the opening of the module to prevent insertion of a cable or other device therein.

As discussed above in this description, the cam member 210 is positioned in the module 204, and preferably within the slots 212 thereof. It is positioned so that movement of the bail latch 208 causes the leg portions 216 thereof to contact the cam member 210. These leg portions 216 ride over the cam member 210, and the exterior surfaces thereof. This movement, as explained above, draws the free ends 218 of the bail latch inwardly and outwardly with respect to an imaginary centerline of the free ends. FIG. 18 illustrates the bail latch 208 in an insertion/removal position, where the bail latch 208 extends in front of and prevents the user from inserting a cable into the module opening 206. At this position, the bail latch leg portions 216 are cammed inwardly, as best illustrated in FIG. 15 and lie, preferably in abutting contact, against the cam member 210 as illustrated. This cam member 210 has a profile that extends upwardly from the floor of the module slot 206, as shown in FIG. 13, and need not have the quarter-spherical configuration shown in the preceding drawing Figures. Moreover, the quarter-spherical configuration may be positioned on the top of a post portion 234 to specify the point exactly where the camming action occurs in the rotation of the bail latch. The free ends 218 of the bail latch 208 have a length that is sufficient for them to clear engagement of the exterior adapter frame 202, so that the module may be inserted and removed without problem.

Figure 19:
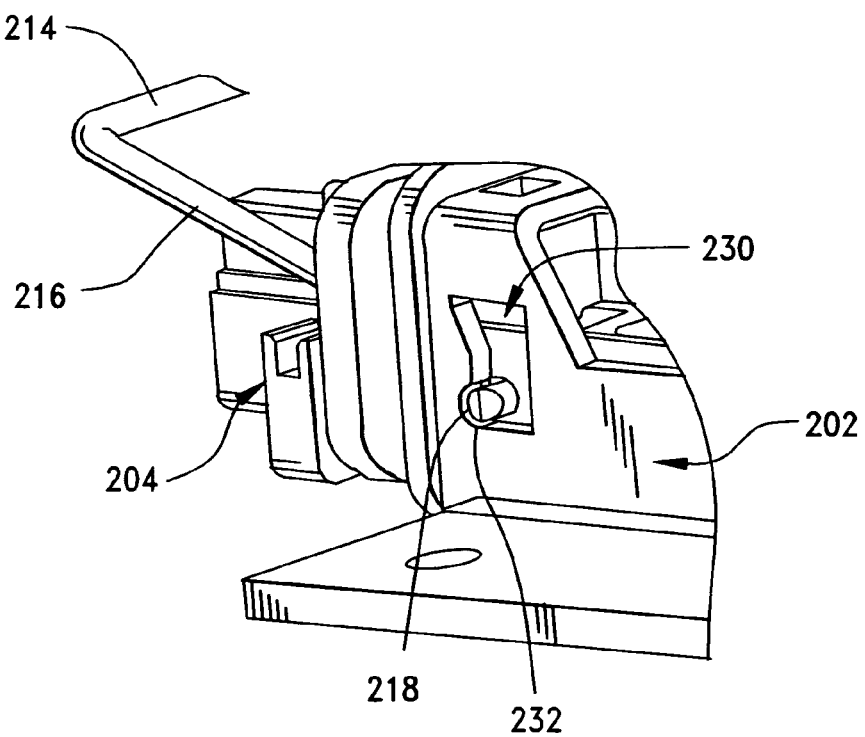
FIG. 19, is an enlarged detail view of the front side of the module as illustrated in FIG. 13, showing one free end of the bail latch engaged with the adapter frame and the bail latch raised above the opening of the module to permit insertion of a cable or other device therein.

Also, as illustrated in FIGS. 18 & 19, the attachment aperture 230 may be specially configured to include an arcuate recess 232 that receives the bail latch free end 218 therein when the bail latch is in the engaged position. The aperture 230 is aligned with the corresponding apertures formed in the bail latch in which the free ends 218 reside. The free ends 218 of the bail latch are shown in a retracted position in FIG. 18.

Figure 20:
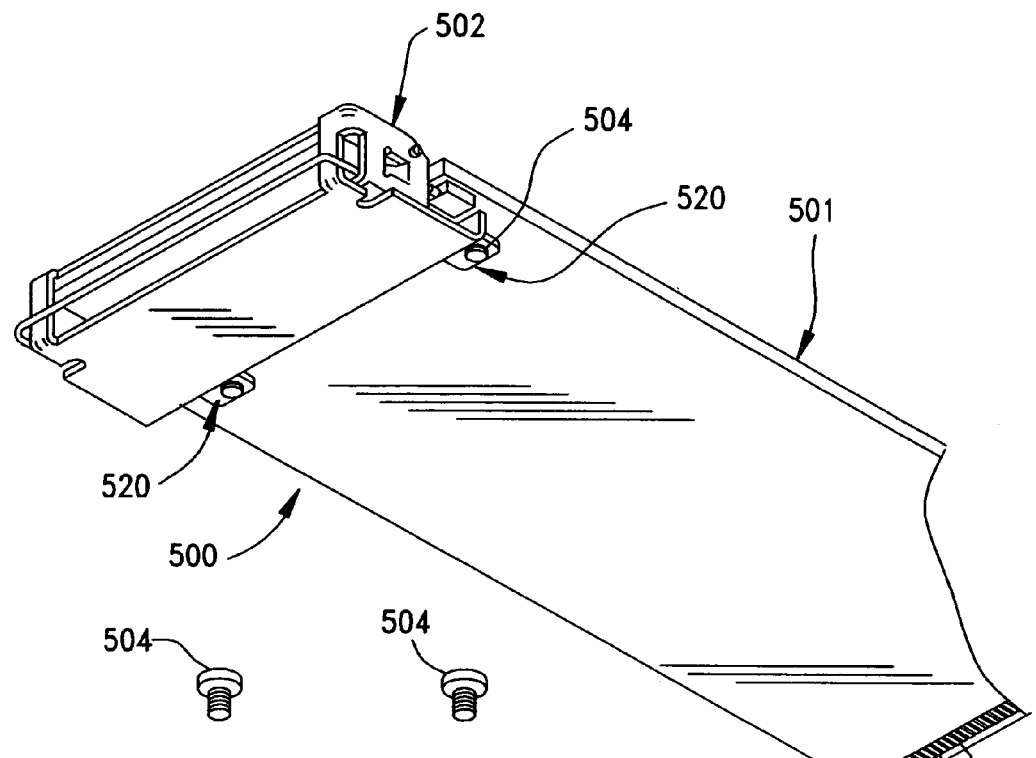
FIG. 20 is a perspective view of a another module incorporating a single-ended embodiment of a retention assembly constructed in accordance with the principles of the present invention.
Figure 21:
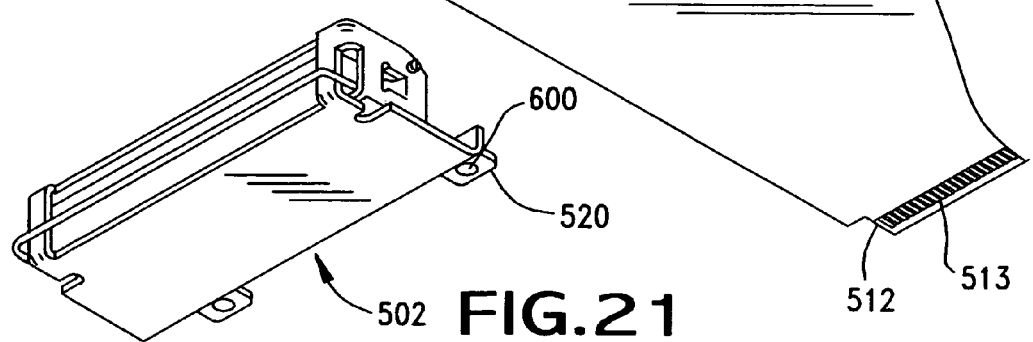
FIG. 21 is an exploded view of FIG. 20.

FIGS. 20–32 illustrate another, "single-ended" embodiment 500 of the invention where one end of the bail latch is fixed for rotation only in the housing, while the other end of the bail latch is free to rotate and to translate (i.e., move laterally) in and out of engagement with an outer assembly or shell. In this embodiment, the module assembly can be seen to include a circuit board 501 and a frontal housing 502 that is attached to the circuit board 501 by way of a suitable means, such as mounting screws 504 that extend through a circuit board 501 and holes 600 formed in mounting tabs 520. A bail latch 550 is provided for opening and blocking access to the interior opening 560 of the housing 502. As illustrated best in FIGS. 20–21, the overall module assembly can be seen to include an elongated circuit board 501 having a rear insertion edge 512 with a plurality of conductive pads or traces 513 disposed thereon for engagement with opposing contacts of an edge connector (not shown). The circuit board 501 includes a front edge 514 and spaced apart from this edge 514, a series of mounting holes 516. The front edge 514 of the circuit board 501 aligns with the rear edge of the top wall 541 of the module housing when the housing is applied to the circuit board 501 so that the front part of the circuit board forms part of the "top" of the adapter module.

These holes 516 receive like screws 504 therethrough and the screws 504 engage with mounting feet, or tabs 520 of the housing member 502. The mounting tabs 520 of the housing member 502 are disposed at the rear in the embodiment shown, and they serve to hold the housing member 502 in place on the circuit board. In this type of assembly, the housing member 502 and the circuit board 501 are designed to fit into an outer housing, member or similar device and the housing assembly is provided with a bail latch that serves to engage with and disengage from the outer housing in a manner similar to that described for the embodiments above.

Figure 22:
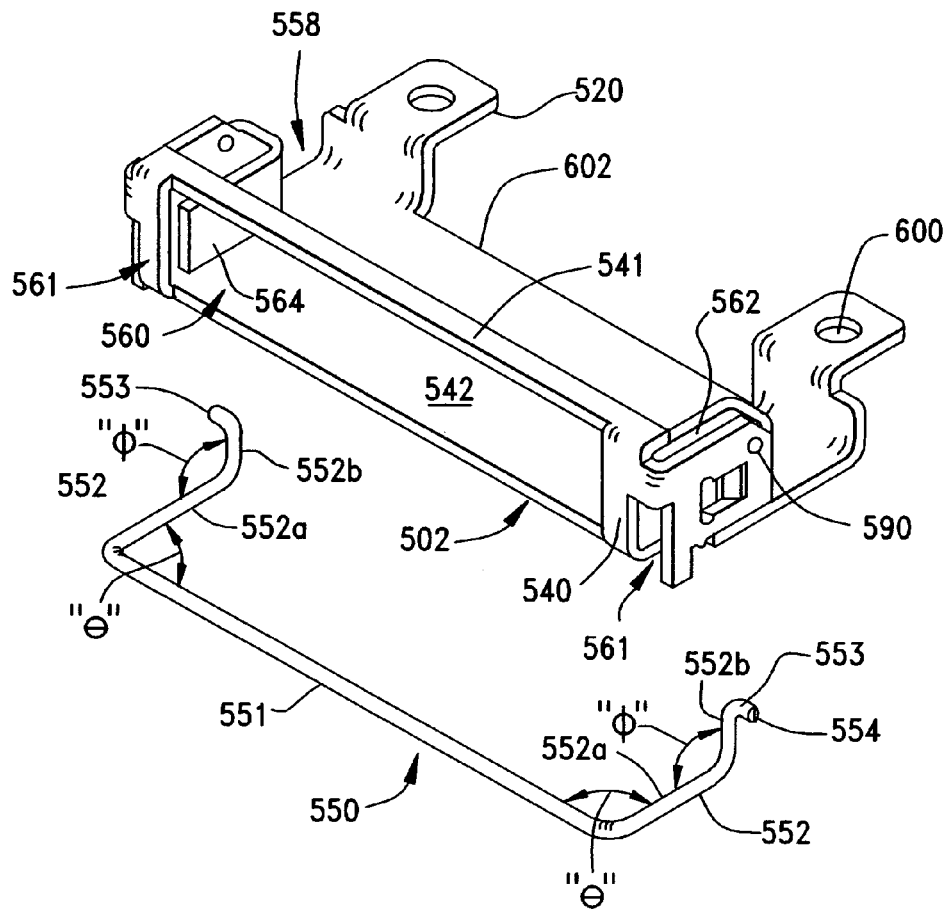
FIG. 22 is a perspective view of the housing and bail latch of FIG. 20 shown in an exploded condition.

FIG. 22 illustrates the bail latch member 550. It has a general U-shape with a central portion, or cross member, 551 that is flanked by two side members, or legs 552 that may be considered as having a bifurcated, or two-directional, configuration. This is accomplished by subportions of the legs 552 lying in two different planes which are angled to each other. The first subportion, 552a, is angled with respect to the cross member portion 551 of the bail member 550 and is spaced apart therefrom by an angle, θ, while the second subportion 552b of each leg 552 is spaced apart from the cross member 551 and is angled from the first subportion 552a by an angle φ. The bail member has two free ends 553 which are generally parallel to the cross member 551 and they are further angled with respect to both subportions 552a, 552b of the legs 552. The ends 554b may be chamfered as shown better in the other drawing Figures. These ends are used to engage with or disengage from an outer member.

Figure 23:
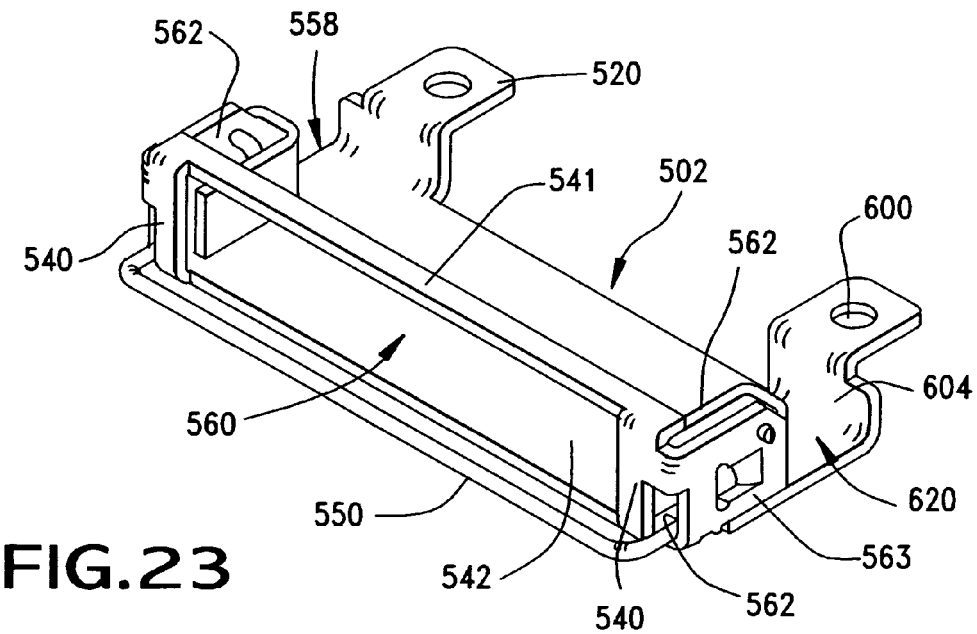
FIG. 23 is the same view as FIG. 22, but with the bail latch in place within the housing member.
Figure 24:
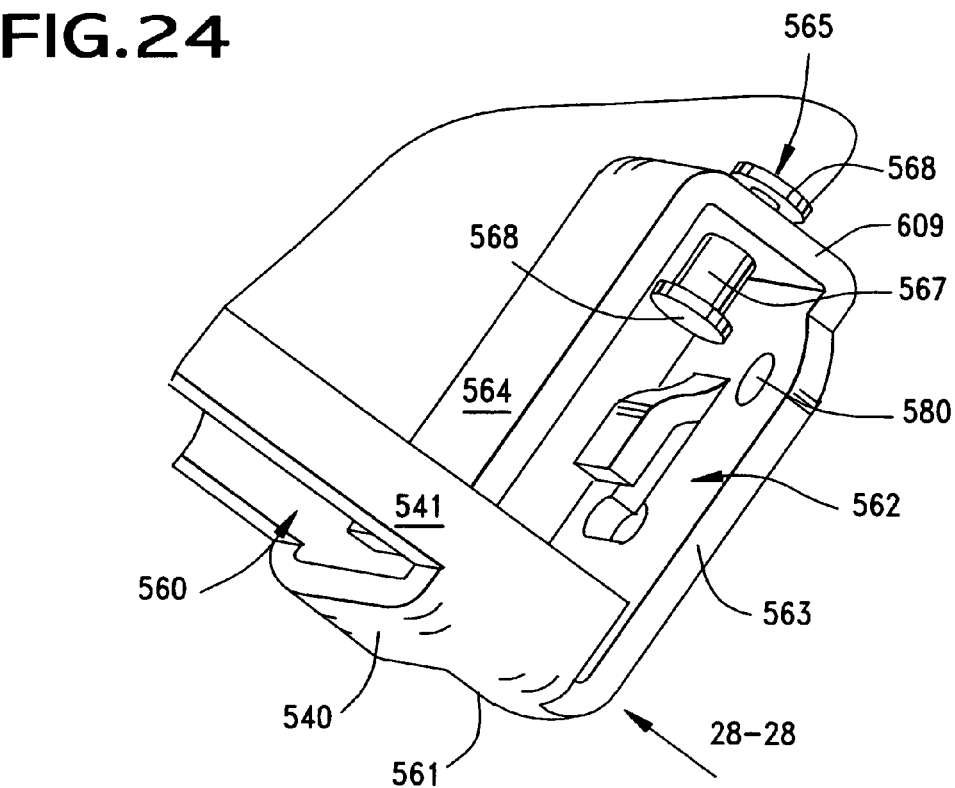
FIG. 24 is an enlarged detail view of one end of the housing-bail assembly of FIG. 23 with the bail removed and illustrating the cam surface of the housing and the switch actuator member in place within a bail latch leg slot thereof.

FIG. 23 illustrates the housing member 502 with the bail member 550 in place therein. It can be seen that the housing member 502 is formed from a piece 558 of sheet metal and is formed in a specific fashion. Preferably, the sheet metal blank is stamped and formed, i.e., bent upon itself to define a front wall 540, and top wall 541 and a bottom wall 542. It includes a central opening 560 formed between these three walls 540, 541, 542 through which an electronic module (not shown) may be inserted. The opening 560 is defined between two sides of the front wall 540 and is flanked by two vertical slots 561 formed therein, each of which preferably opens into a bay 562 that is defined between the end walls 563 of the housing member 502 and two interior walls 564. The bays 562 are formed by bending the metal around upon itself from the front to the back and then back again to the front to define the bays 562, which are best illustrated in FIG. 24.

The use of sheet metal to form this housing member results in a savings in cost over the die-cast housings that are illustrated in FIGS. 1–19. Such a housing is more easily attached to its associated circuit board 501. The bottom wall 542 of the housing 502 is further bent upwardly long its rear edge 602 to form two endwalls 604 that lead upwardly to the mounting tabs 520. These endwalls 604, as seen in the Figures, are spaced apart from the rear walls 609 of the housing that define the open bays 562.

Figure 26:
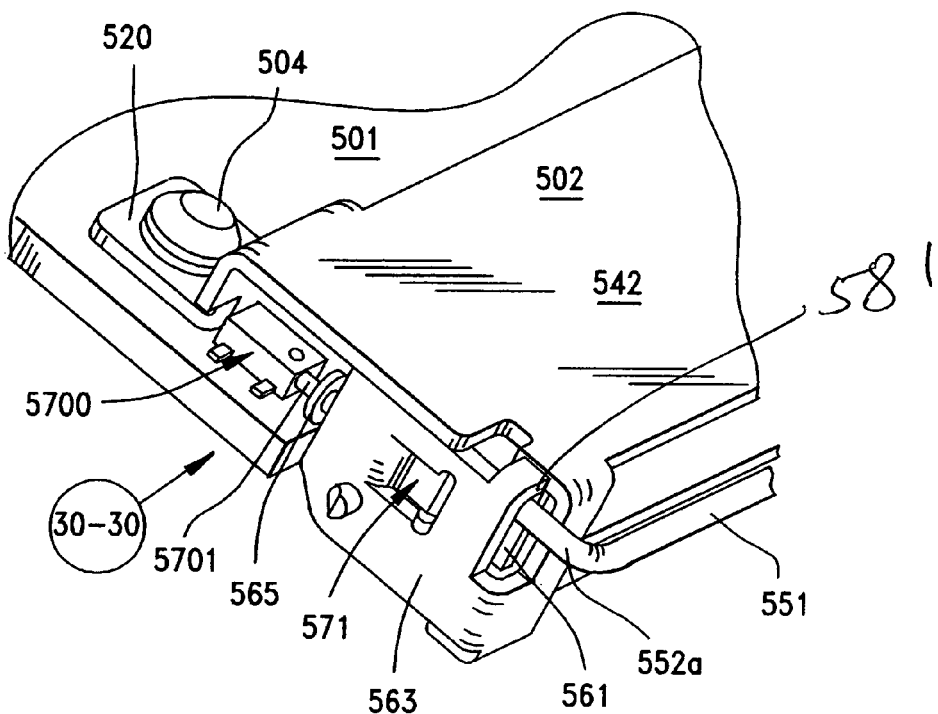
FIG. 26 is an enlarged view of the engagement side of the housing assembly of FIG. 20 illustrating the placement of the indicating switch in proximity to the housing and on the circuit board.

One of the bays 562 may include a switch actuator member 565 which has an overall plunger-like shape and which may include a pair of interengaging pieces 566a, 566b which are interengagable with each other to form a plunger having a elongated body portion 567 and two enlarged, and preferably flat, head or contact portions 568 that may bear against opposing working elements. The switch actuator member 565, as illustrated, is slidably held within an end wall 609 of the housing and is moved into and out of contact FIG. 26 illustrates an indicator switch 5700 with a tip end 5701 that is mounted to the circuit board 501 in proximity to the plunger actuator 565 and this indicator switch may be used to indicate the position of the bail 550 and whether the module housing assembly is engaged in place within an outer member. The switch 5700 will fit into the gap 620 that occurs between the rear wall 609 and the end wall 604 which leads up to the mounting 520.

Figure 25:
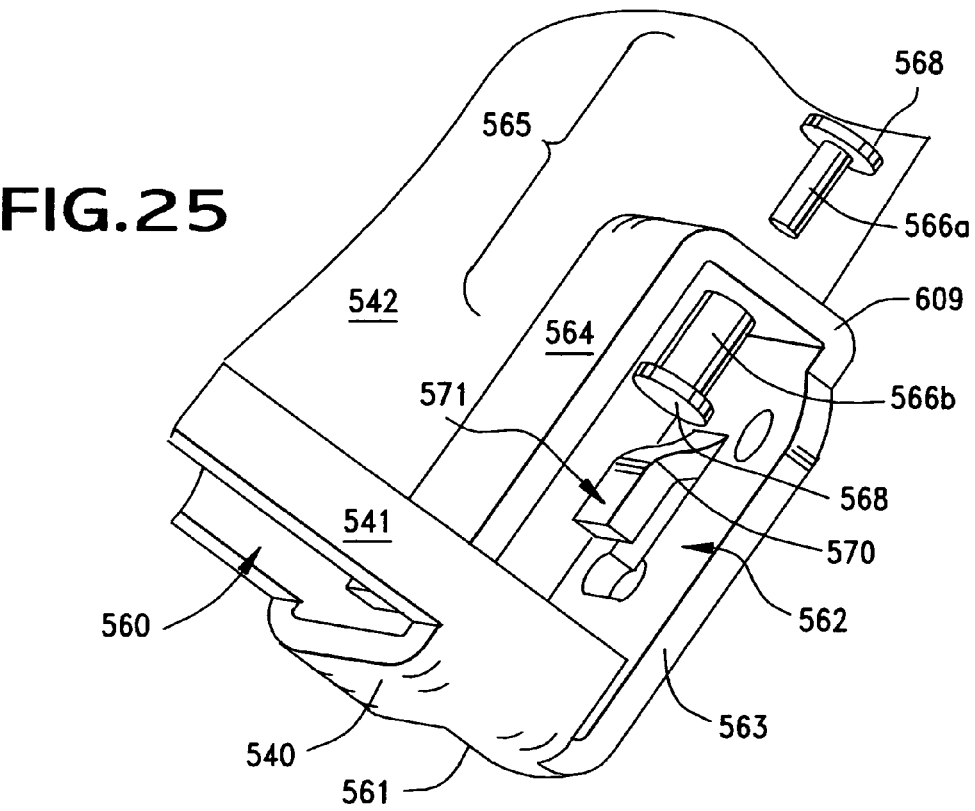
FIG. 25 is the same view as FIG. 24, but with the switch actuator member exploded into its two components.
Figure 27:
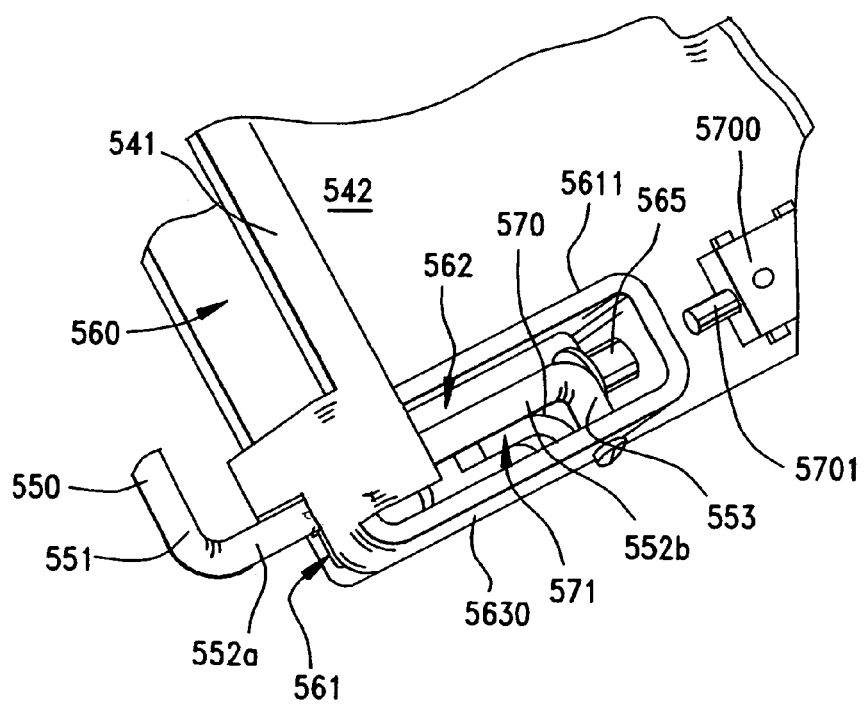
FIG. 27 is the same view as FIG. 24, but with the bail latch leg in place within the housing slot and the switch in placement next to the actuator.
Figure 28:
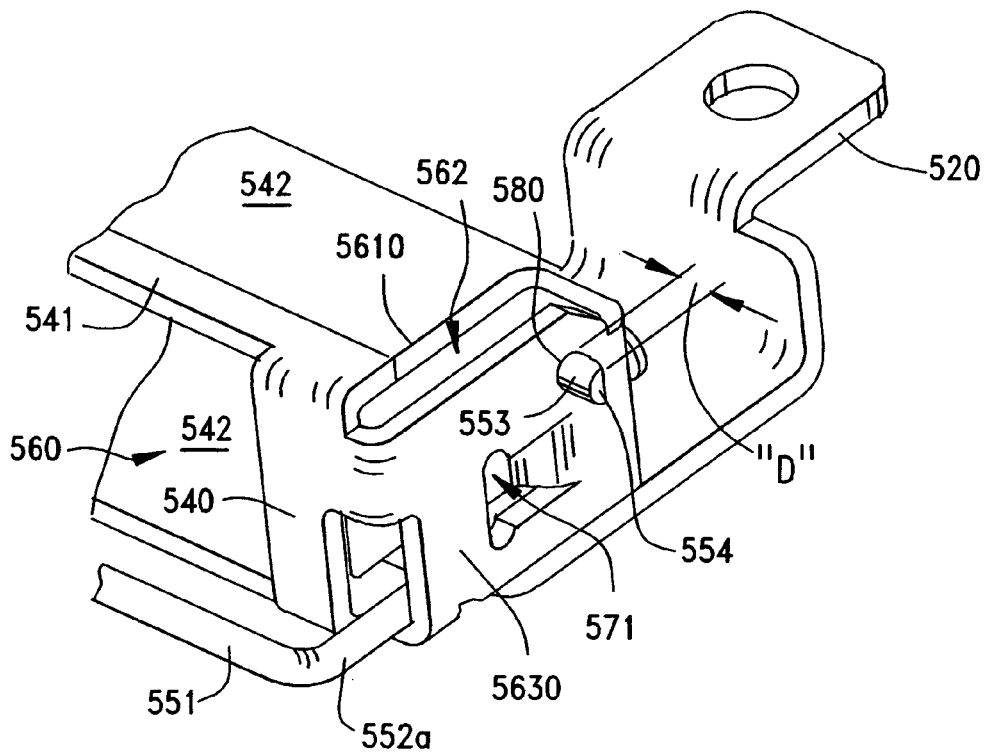
FIG. 28 is an angled side view taken along the direction of arrow 28—28 of FIG. 24, but with the bail latch in place within the housing, illustrating the bail latch in a first operative position.
Figure 29:
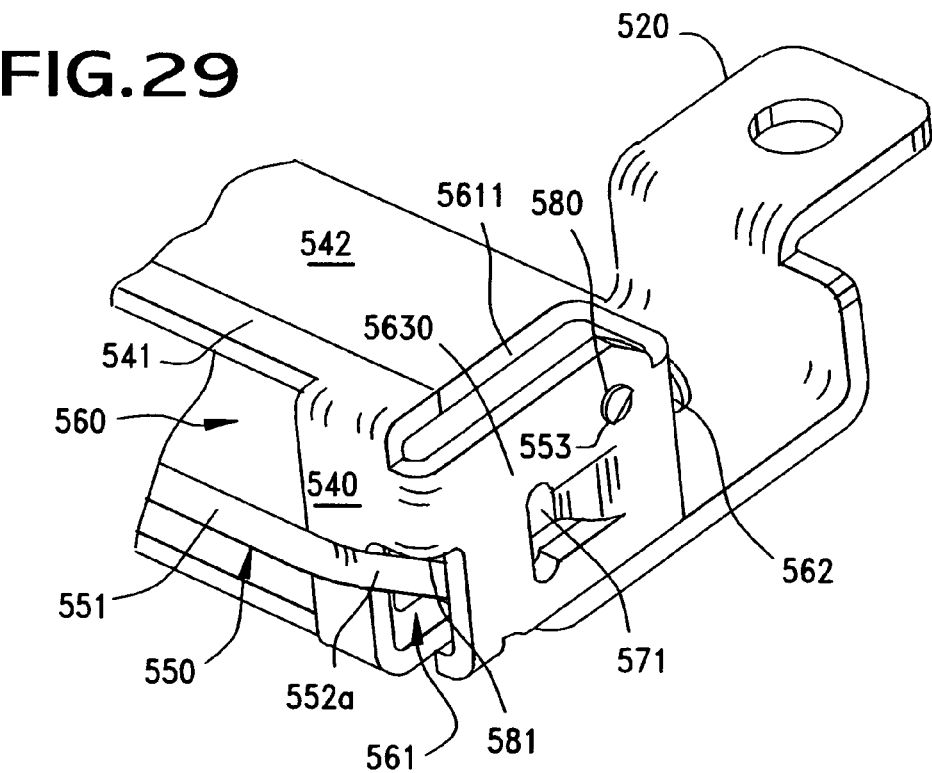
FIG. 29 is the same view as FIG. 28, but illustrating the bail latch in a second operative position.
Figure 30:
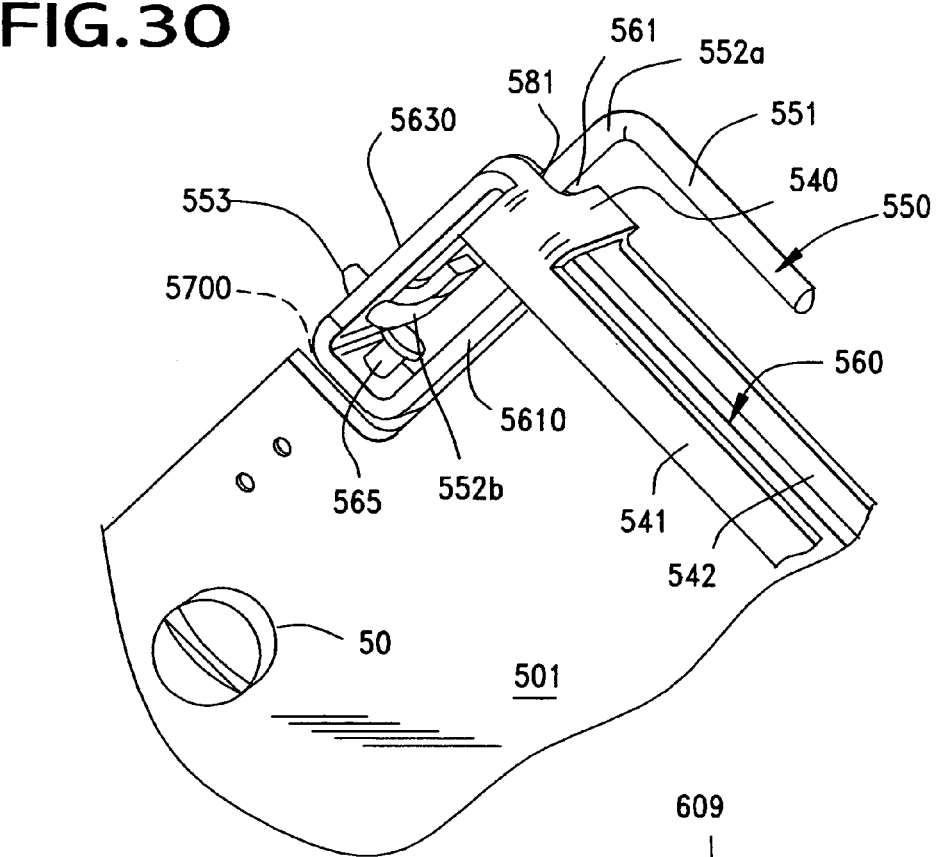
FIG. 30 is an enlarged detail view taken from the bottom of FIG. 26 along the direction of arrow 30—30 thereof.

In this embodiment of the present invention, because the housing member 502 is stamped and formed from sheet metal, the cam surface which actuates the bail latch engagement ends 553 may also be stamped and formed from the sheet metal blank. This cam surface 570 is best illustrated in FIG. 25 and it can be seen that it is defined along a cam member 571 that is stamped from the housing member end wall 5630 and formed so that it projects, preferably in the curved fashion shown, into the bail leg-receiving bay 562. The cam member 571 is disposed in the bay 562 a preselected distance from the plunger actuator 565. The cam surface 570 can be seen to extend vertically within the bay 562, and in a direction that is transverse to an axis of the hole that receives the engagement end 554 of the bail 550. The vertical subportion 552b of the bail leg portions 552 ride up upon the cam surface 571 and this is best shown in FIG. 27.

As mentioned above, the bail latch 550 is movable between two operative positions. The first such position is illustrated best in FIG. 28, where it can be seen that the bail latch center portions 551 is beneath the level of the housing member opening 560 or at least not interferingly positioned so as to obstruct or prevent the insertion of an electronic module into the module housing opening 560. In this position, the free engagement end 553 of the bail latch projects out through a receiving hole 580 that is formed in the end wall 563. The distance D, which the end 553 projects is enough to engage a corresponding opening formed in an outer housing member (not shown) to thereby retain the module assembly 500 in place therein. When the bail latch member 550 is moved (lifted up) to its second operative positions as shown best in FIG. 29, the second subportion 552b of the bail leg 552 is cammed over and onto the cam surface 570, thereby drawing the engagement end 553 inwardly into the bay 562 reducing its projection down to a distance sufficient to maintain the bail latch in place in the housing member 502, but small enough to permit insertion and removal of the module assembly 500 into or out of an outer member. The extent to which the second sub portion 552b rides onto the cam surface 570 is best shown in FIG. 27.

In this second position, the bail latch central portion 551 extends across the opening 560 and it prevents an electronic module from being inserted into the module housing opening 560. The upper travel of the bail latch 550 may be limited by its contact with the top edge 581 of the module housing slot 561. Although only one end of the module housing assembly has been shown, it will be understood that both such ends may include the cam members 571 formed therewith, or the cam member 571 may be formed in a single end, keeping the other engagement end 553 of the bail latch free to rotate in its movement between the two operative positions, but without an associated cam member, that other end will not have any translational movement in the widthwise direction of the module housing.

Figure 31:
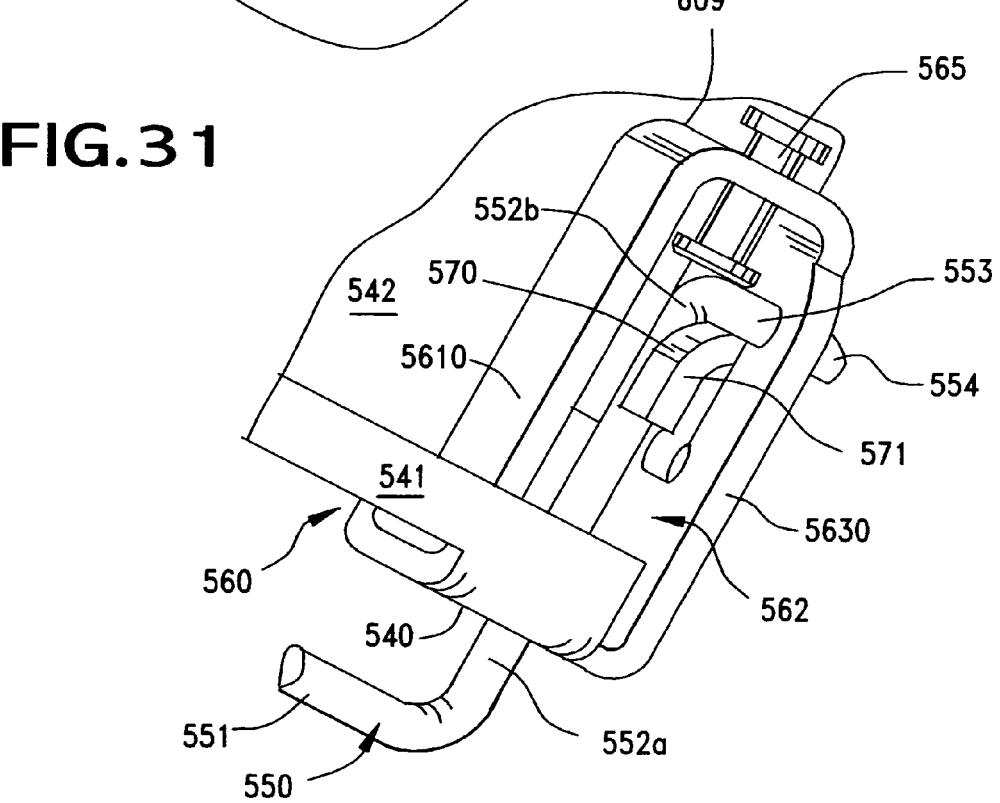
FIG. 31 is an enlarged detail view of the engagement end of the housing illustrating the bail latch in its first operative position; and, FIG. 32 is the same view as FIG. 31, but with the bail latch in its second operative position where the leg portion thereof has ridden up and over onto the cam surface of the housing cam member.
Figure 32:
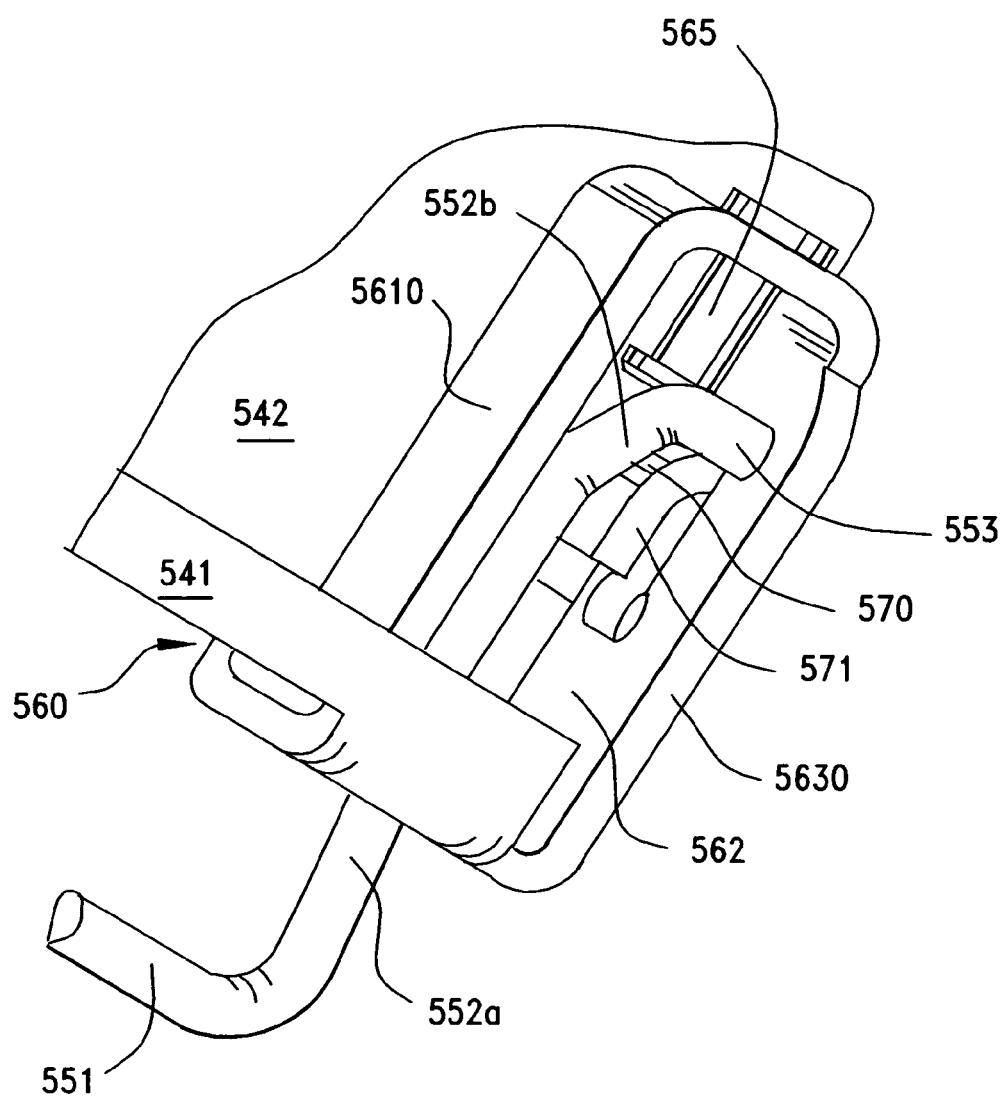

The configuration of the bail 550 also assists in triggering the indicator switch 5700. The angled end formed by the intersection of the second subportion 552b and the free end 553 is moved into and out of contact with the actuator 565. This contact is best illustrated in FIG. 31, while FIG. 32 illustrates the bail moved outwardly so that its engagement end 553 is cammed inwardly and the angled intersection of the two prior mentioned portions is deflected out away from and out of contact with the actuator member 565.

It will be understood that the invention may be embodied in other specific forms without departing from the spirit thereof. The present examples and embodiments, therefore, are to be considered in all respects as illustrative and not restrictive, and the invention is not to be limited to the details given herein.

The invention claimed is:

1. An adapter module for insertion into and removal from an outer frame, the adapter module comprising:
   a module housing having a bottom wall, a top wall and a front wall, the top, front and bottom walls cooperatively defining an opening of the adapter module, the opening being sized to permit entrance of an electronic module therein, the module housing further including sidewalls and interior walls that cooperatively define at least one bay of said module housing proximate to said opening;
   a circuit board to which said module housing is mounted; and
   a retention member rotatably mounted to said module housing for selectively retaining the adapter in place within the outer frame, the retention member including a U-shaped retention member having spaced-apart legs that extend offset to a longitudinal cross member which connects said spaced-apart legs together, said retention member further including a pair of free ends, each of the free ends extending offset from said legs and spaced apart from said cross member, said free ends being supported by said module housing side walls, and one of said free ends being received within an aperture in one of said side walls, whereby
   said retention member is moveable between a first position at which said one free end projects out of said aperture and into securing engagement with the outer frame and a second position wherein said one free end is withdrawn from securing engagement with said outer frame.

2. The adapter module in accordance with claim 1, further including a cam surface formed on one of said module housing side walls, the cam surface extending into one of said bays, said cam surface further being positioned within the one bay for interference engagement with said retention member to thereby effect movement of said at retention member one free end between being out of securing engagement and being in securing engagement with said outer frame during movement of said retainer member between said first position and said second position.

3. The adapter module in accordance with claim 1, wherein said module housing is stamped and formed from sheet metal.

4. The adapter module in accordance with claim 3, wherein each of said module housing bays provide a hollow area into which said retention member free ends and portions of said legs extend and move between said first and second operative positions without interference with a module inserted into said module housing opening.

5. The adapter module in accordance with claim 1, wherein said retention member legs each include first and second portions that extend angles to each other, such that said free ends extend generally parallel to said cross member.

6. The adapter module in accordance with claim 5, wherein said retention member first leg portions extend at angles to said cross member and said second leg portions extend at angles to the first leg portions so that said free ends and cross member lie in different planes.

7. The adapter module in accordance with claim 2, wherein said cam surface is stamped from said module housing side wall and said cam surface extends into said one bay.

8. The adapter module in accordance with claim 1, wherein said side walls, interior walls and said bays extend at an angle from said module housing opening.

9. The adapter module in accordance with claim 1, wherein said one bay includes an actuator member supported by said module housing, the actuator member being positioned proximate to said cam surface such that said retention member contacts said actuator member during movement of said retention member between said first and second operative positions.

10. The adapter module in accordance with claim 9, further including a switch supported by said module housing in opposition to said actuator member, such that said actuator member contacts said switch during movement of said during movement of said retention member between said first and second operative positions.

11. The adapter module in accordance with claim 10, wherein actuator member moves linearly in response to contact between said retention member and said actuator.

12. The adapter module in accordance with claim 1, wherein said module housing includes a pair of end walls that are spaced apart from said opening, the end walls terminating in mounting tabs for mounting said module housing to said circuit board.

13. The adapter module in accordance with claim 12, wherein said module housing end walls extend at an angle from said bottom wall and the mounting tabs extend at an angle to said bottom wall.

14. The adapter module in accordance with claim 1, wherein said module is mounted to a bottom surface of said circuit board.

* * * * *